D. H. WHITTEMORE.
Vegetable Cutter.
No. 10,116.
Patented Oct. 11, 1853.
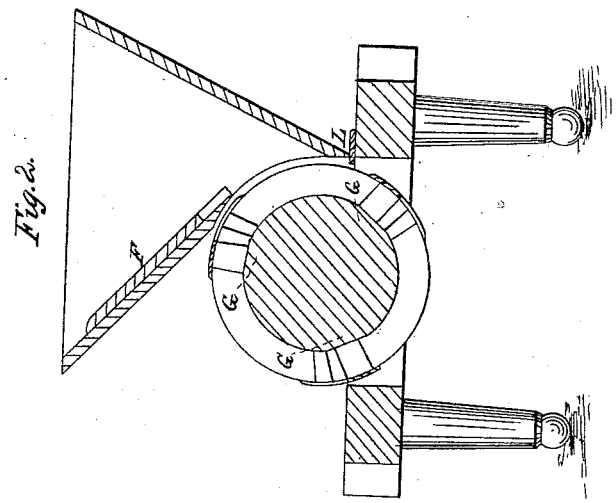
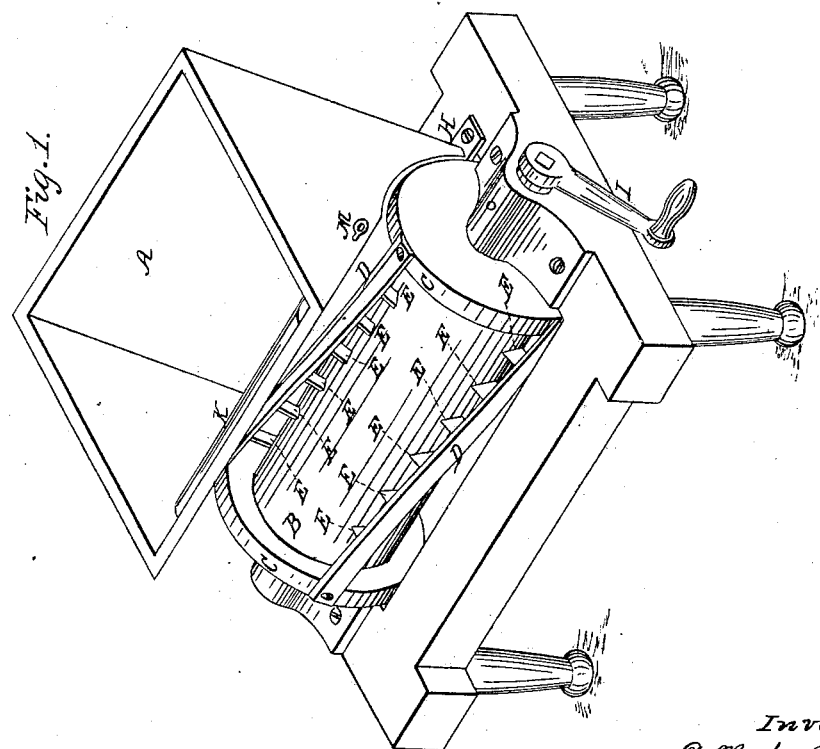
Inventor
D. Henshaw Whittemore

UNITED STATES PATENT OFFICE.

D. H. WHITTEMORE, OF CHICOPEE FALLS, MASSACHUSETTS.

VEGETABLE-CUTTER.

Specification of Letters Patent No. 10,116, dated October 11, 1853.

*To all whom it may concern:*

Be it known that I, D. HENSHAW WHITTEMORE, of the village of Chicopee Falls, in the county of Hampden and State of Massachusetts, have invented a new and useful Machine, called an "Improved Root-Cutter," for Cutting Roots of Various Kinds that are to be Fed to Cattle, Horses, Sheep, &c.; and I do hereby declare that the following is a full, clear, and exact description of the construction and operation of the same, reference being had to the annexed drawings, making a part of this specification, in which—

Figure 1 is a perspective view, and Fig. 2 a transverse sectional view.

In Fig. 1, A is the hopper in which the roots to be cut are placed, B is a cylinder with two heads or flanges C C to which long knives as D D are attached in an oblique position. E E E, &c., are short knives inserted in the body of the cylinder between it and the long knives, the edges of the long knives projecting a little forward of the edges of short ones. The hopper A has its ends cut out circularly so as to fit the circular flanges of the cylinder and it has a sliding panel K, more plainly shown at F, Fig. 2 to regulate the feed. This panel when raised admits a larger, and when lowered a smaller quantity of roots in contact with the knives. The beveled sides of the edges of the long knives are placed outward as shown in the drawings and the body of the cylinder opposite the long knives where the short knives are inserted is chamfered off so as to form a level surface as shown at G G G Fig. 2.

H in Fig. 1 is a bed knife reaching the whole length of the cylinder and made fast to the frame; a transverse section of this bed-knife is likewise shown at L Fig. 2.

I in Fig. 1 is a crank by which the machine is put in motion.

M in Fig. 1 is an iron pin to hold the slide in its proper place.

The long and the short knives act upon the roots at the same time dividing and subdividing them into sufficiently minute parts.

My invention I conceive possesses advantages over others of a similar kind, inasmuch as, by placing the beveled sides of the edges of the long knives outward thinner slices are cut from the roots by the long knives and by chamfering off the body of the cylinder, the spaces between the long knives and the body of the cylinder, through which these slices pass, are enlarged; therefore the machine is less liable to be choked or clogged; and by combining the long and the short knives in the manner as above described, the roots are more minutely subdivided, the machine less complex, more substantial, and performs its work with greater expedition.

What I claim as my invention and desire to secure by Letters Patent is—

The combination of the long and short knives on the periphery of the cylinder with the hopper arranged as described and represented.

In witness whereof I have hereunto set my signature this 6th day of August one thousand eight hundred and fifty-three.

D. HENSHAW WHITTEMORE.

In the presence of—
  JONA. R. WHITTEMORE,
  JOHN R. WHITTEMORE.